United States Patent [19]

Artaud et al.

[11] 4,366,854
[45] Jan. 4, 1983

[54] HEAT EXCHANGER FOR NUCLEAR REACTOR

[75] Inventors: Robert Artaud, Aix en Provence; Michel Aubert, Manosque; Richard Elbeze, Aix en Provence; Charley Renaux, Jouques, all of France

[73] Assignee: Commissariat a l'Energie Atomique, France

[21] Appl. No.: 155,120

[22] Filed: May 30, 1980

[30] Foreign Application Priority Data

May 31, 1979 [FR] France .............................. 79 13999

[51] Int. Cl.³ .............................................. F28D 1/06
[52] U.S. Cl. ........................................ 165/74; 122/32; 165/157; 376/405
[58] Field of Search .................. 165/145, 157, 158, 74, 165/72; 122/32; 376/405, 404

[56] References Cited

U.S. PATENT DOCUMENTS

| | | | |
|---|---|---|---|
| 3,242,981 | 3/1966 | Hutchinson et al. | 165/74 X |
| 4,098,329 | 7/1978 | Culver | 165/158 X |
| 4,101,377 | 7/1978 | Berniolles | 165/74 X |
| 4,216,821 | 8/1980 | Robin | 165/11 R |

FOREIGN PATENT DOCUMENTS 45-31512 12/1970 Japan ................................. 165/74

Primary Examiner—Albert W. Davis, Jr.
Attorney, Agent, or Firm—Thomas J. Greer, Jr.

[57] ABSTRACT

Heat exchanger for a nuclear reactor of the type in which the main vessel is sealed by an upper slab, comprises a plurality of substantially straight exchange tubes mounted between on the one hand an upper annular tube plate associated with a secondary fluid discharge chamber and on the other a lower annular tube plate associated with a supply chamber, a ferrule surrounding the said tubes and provided with a discharge orifice for the primary fluid, a central shaft which communicates with the supply chamber, and a supply manifold and a discharge manifold for the secondary fluid, wherein it comprises a supporting ferrule fixed to the periphery of the upper tube plate and sealed at its upper end by a dome, said ferrule having on its outer periphery a supporting flange by the said slab, the manifolds being superimposed in the supporting ferrule and fixed to a horizontal plate, which is itself fixed to the supporting ferrule, the supply manifold being connected by at least one pipe to the upper end of the shaft, the discharge manifold being connected to the discharge chamber also by means of a pipe, whereby the pipes are positioned in the supporting ferrule.

5 Claims, 5 Drawing Figures

HEAT EXCHANGER FOR NUCLEAR REACTOR

BACKGROUND OF THE INVENTION

The present invention relates to a heat exchanger for a nuclear reactor.

More specifically the invention relates to a heat exchanger for fast neutron nuclear reactors cooled by a liquid metal such as sodium in which exchangers are located in the main tank of the reactor. Such exchangers, commonly called intermediate exchangers, ensure a heat transfer between the primary fluid which is most often constituted by liquid sodium and a secondary fluid which is also liquid sodium, whereby said secondary sodium within the tank exchanges its calories with a water-vapour circuit to produce electric power.

More specifically the invention relates to sodium-sodium exchangers of the straight tubular type in which these tubes are mounted between a secondary fluid supply chamber and a secondary fluid discharge chamber. The group of tubes is in the form of an annulus arranged between an outer ferrule and an inner shaft for supplying the supply chamber. Moreover, in this type of generator the primary liquid metal is supplied and discharged by two open orifices, respectively in the upper part and lower part of the outer ferrule between the supply and discharge chambers.

In the case of integrated reactors and as will be better understood by referring to the attached FIG. 1 which will be described hereinafter, the heat exchanger is suspended by its upper portion on a slab which seals the reactor vessel. Considerable masses are involved because this exchanger has, for example, an exchange length of 8 meters, the corresponding volume being filled by liquid sodium. In addition, the sodium is kept under a slight pressure to ensure its circulation, so that it applies dynamic stresses to the different parts of the exchanger. Finally, there are significant temperature gradients in the different parts of the exchanger, leading to thermal expansion problems, which in turn cause mechanical stresses within the exchanger.

FIG. 1 shows, in vertical sectional form, a fast neutron reactor cooled by a liquid metal and of the integrated type.

In the greatly simplified FIG. 1 it is possible to see the concrete enclosure 2, whose upper part is sealed by slab 4. The main vessel 6 is suspended on the slab, whilst flooring 8 supports the reactor core 10. An inner vessel 12 with a recess 13 separates the hot sodium from the cold sodium. Intermediate exchangers, such as 14, are suspended on slab 4. Each exchanger sealingly traverses the recess 13. A supply orifice 56 (positioned above the recess) and a discharge orifice 58 (positioned below the recess) ensure the circulation of the primary sodium within the exchanger. Each exchanger has a group of straight or substantially straight tubes, the term "substantially" meaning that the tubes can have over a portion of their length and particularly at their ends helically shaped regions which give the tubes a greater flexibility. There are also primary pumps such as 15 suspended on slab 4. These pumps have supply orifices 16 and their outlet is connected by tubes such as 18 to the support 20 of the reactor positioned below the core 10. Secondary fluid, which is also usually sodium, circulates within exchanger 14.

BRIEF SUMMARY OF THE INVENTION

The invention relates to an improved embodiment of the intermediate exchanger 14.

The present invention relates to a heat exchanger for a nuclear reactor of the type in which the main vessel is sealed by an upper slab, comprises a plurality of substantially straight exchange tubes mounted between on the one hand an upper annular tube plate associated with a secondary fluid discharge chamber and on the other a lower annular tube plate associated with a supply chamber, a ferrule surrounding the said tubes and provided with a discharge orifice for the primary fluid, a central shaft which communicates with the supply chamber, and a supply manifold and a discharge manifold for the secondary fluid, wherein it comprises a supporting ferrule fixed to the periphery of the upper tube plate and sealed at its upper end by a dome, said ferrule having on its outer periphery a supporting flange by the said slab, the manifolds being superimposed in the supporting ferrule and fixed to a horizontal plate, which is itself fixed to the supporting ferrule, the supply manifold being connected by at least one pipe to the upper end of the shaft, the discharge manifold being connected to the discharge chamber also by means of a pipe, whereby the pipes are positioned in the supporting ferrule.

Preferably the upper end of the shaft is fixed to a balloon-like member, which is connected to the supply manifold by a plurality of helical pipes, whilst the discharge chamber is connected to the discharge manifold by a plurality of also helical pipes.

According to a first embodiment the shaft is constituted by an outer ferrule fixed by its lower end to the inner periphery of the lower annular tube plate and an inner ferrule fixed to the balloon-like member by its upper end and defining with the outer ferrule an annular space provided at its lower end and level with the lower tube plate with means for bringing about a semi-sealing.

According to a second embodiment the inner portion of the shaft is constituted by two coaxial pipes welded at their lower end, the annular space defined by the two pipes issuing above the discharge chamber.

BRIEF DESCRIPTION OF THE DRAWINGS

The invention is described in greater detail hereinafter relative to two non-limitative embodiments and with reference to the drawings, wherein show.

DETAILED DESCRIPTION OF THE PREFERRED EMBODIMENTS

With more particular reference to FIGS. 2a and 2b the structure of the intermediate exchanger according to the invention will be described. FIG. 2b shows the lower part which essentially consists of the exchange zone between the primary fluid and the secondary fluid.

Figure 1:
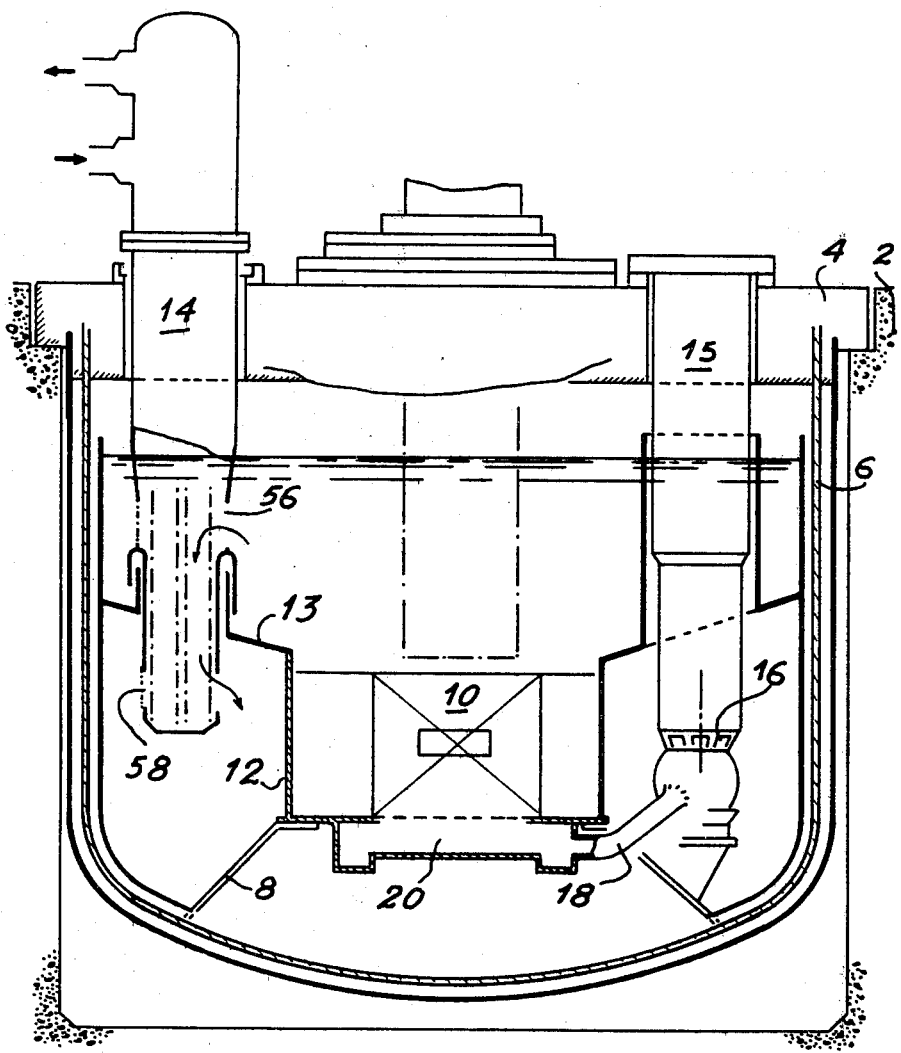
FIG. 1a, which has already been described, a vertical sectional view of a nuclear reactor cooled by a liquid metal and of the integrated type.
Figure 2A:
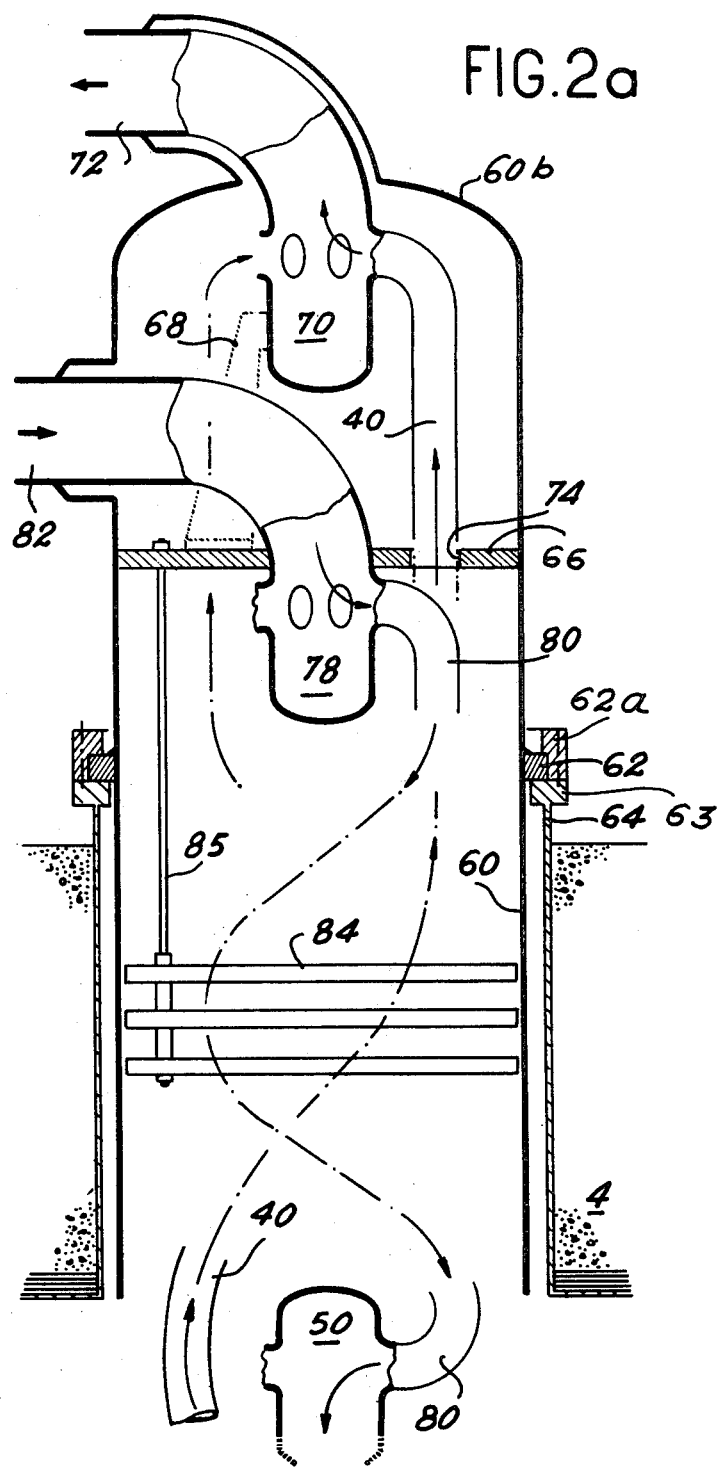
FIG. 2a, a vertical sectional view of upper part of the heat exchanger according to the invention.
Figure 2B:
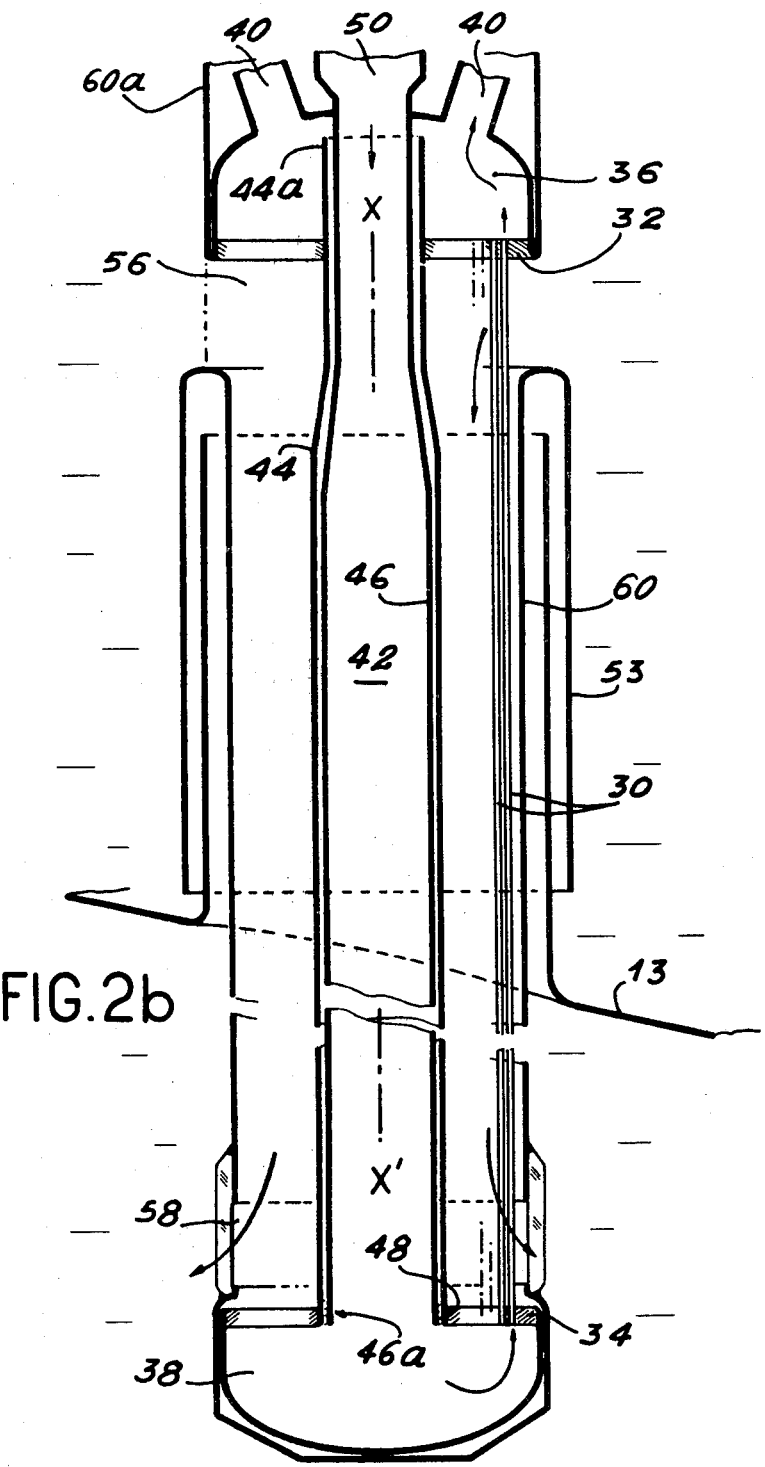
FIG. 2b, a vertical sectional view of the lower part of the same heat exchanger.

FIG. 2a more particularly shows the secondary fluid supply system and the heated secondary fluid discharge system after heat exchange, said system constituting the upper part of the exchanger.

The exchange surface is constituted by substantially straight exchange tubes 30 which are mounted between an upper annular tube plate 32 and a lower tube plate 34, which is also annular. The group of exchange tubes 30 also has an annular configuration constituted, for example, by concentric layers of vertical axis X-X', said axis also constituting the axis of symmetry of the exchanger system. Hemispherical members constituting respectively the secondary fluid discharge chamber 36 and the secondary fluid supply chamber 38 are welded to the annular tube plates 32 and 34. A plurality of discharge pipes 40, arranged in a regular manner with respect to the annular chamber 36 is connected to discharge chamber 36. Chamber 38 is supplied with secondary fluid by an axial shaft 42, which traverses the annular plates 34 and 32.

In the embodiment of FIG. 2b shaft 42 is defined by the inner ferrule 46, whose upper end is welded to the hemispherical member defining the discharge chamber 36 and whose lower end 46a is free. Ferrule 46 is surrounded by an outer cylindrical ferrule 44, is welded at its lower end to a lower tube plate 34 and at its upper end to the upper tube plate 32. The upper end 44a of said ferrule enters the upper discharge chamber 36. The lower end 46a of inner ferrule 46 is provided on its outer face with segments or sealing members 48 co-operating with the lower end of the outer ferrule 44 to ensure semi-sealing (as is apparent in the detailed view of FIG. 3a). The upper end of the inner ferrule 46 is connected above the annular chamber 36 to a balloon-like supply member 50. The group of tubes 30 is externally surrounded by a supporting ferrule 60. Ferrule 60 is provided at its upper end with an orifice for the introduction of primary liquid metal 56 and at its lower end with an orifice 58 for the discharge of the same primary liquid metal, which is generally sodium. As is well known in the art ferrule 60 has an outer skirt 53 defining an argon-filled space which ensures a pneumatic sealing between the hot sodium and the cold sodium respectively positioned above and below the recess 13.

The upper part of the exchanger has in particular the supply and discharge systems for the primary liquid metal enclosed in ferrule 60. The latter is provided on its outer periphery with a flange 62 by which said ferrule is supported. For this purpose flange 62, which is held in place by an adaptor or counter-flange 62a, bears on the reactor slab 4 by means of flange 63 and sleeve 64. The upper portion 60a of the supporting ferrule 60 is welded to the outer periphery of the upper tube plate 32. Thus, the upper tube plate 32, exchange tubes 30, ferrule 44 and lower tube plate 34 as well as the associated chamber 38 are supported by means of ferrule 60.

There is a substantially horizontal support plate 66 in the upper part of the supporting ferrule 60 and below its sealing dome 60b. Plate 66 supports by means of a member 68 the hot manifold 70 associated with a large pipe 72 ensuring the discharge of the hot secondary liquid metal from the exchanger. This hot collector 70 is connected to pipes 40 which pass out of the upper annular chamber 36. These pipes 40 traverse the support plate 60 by bores 74. As is apparent from the drawings and in order to absorb thermal expansions pipes 40 have a helical shape. Below the support plate 66 there is a cold secondary liquid metal manifold 78 connected to the balloon-like member 50 by means of pipes 80, which issue in regular manner over the periphery of manifold 78. Pipes 80 are also helical in order to facilitate the absorbtion of thermal expansion. The cold manifold is associated with a large cold secondary liquid metal supply pipe 82 supported by plate 66.

In the upper area surrounded by the supporting ferrule 60 there is also a system of horizontal biological protection plates 84, which are also supported by the support plate 66 by means of brace rods such as 85. These plates complete the neutron protection provided by the reactor slab at the point where said protection is interrupted by the passage of the intermediate exchanger.

According to this first embodiment it can be seen that the tube plates, as well as the exchange plates, are supported by the portion of ferrule 60 positioned below flange 62. The supply manifold 78 and discharge manifold 70 are supported by the plate 66 positioned above the supporting flange 62.

Figure 3A:
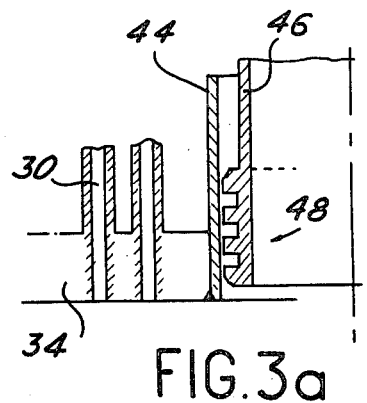
FIG. 3a, a detail of FIG. 2a showing the connection between the central shaft and the lower tube plate.
Figure 3B:
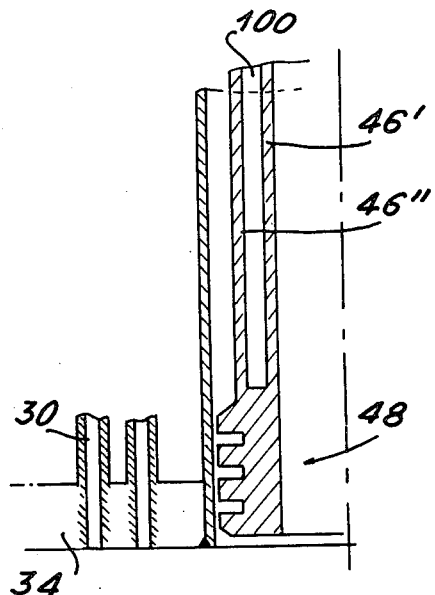
FIG. 3b, a detail of a constructional variant of the connection between the lower tube plate and the central shaft.

According to the variant of FIG. 3b the shaft is constituted by two coaxial tubes 46' and 46" welded at their lower end and defining an annular space 100 which issues at its upper end above the discharge chamber 36. This annular space contains argon ensuring a thermal insulation between the "hot" primary sodium and the "cold" secondary sodium. The different members of the exchanger are supported in the same way as in FIG. 3a.

It can be gathered from the previous description of the intermediate exchanger according to the invention that the latter has numerous advantages compared with prior art exchangers.

Thus, as the group of tubes 30 is no longer connected to the upper part of the exchanger there is a relief of tube plates 32 and 34 with regard to the forces and stresses to which they are exposed. The group of tubes and the plates are only exposed to their own mechanical loading due to the outflow of the primary sodium. In addition, the stresses due to the displacements of the secondary pipes 40 and 80 no longer pass through the tube plate. With respect to the upper plate the stresses pass through the supply balloon-like member 50, the hot secondary sodium discharge chamber 36 and the supporting ferrule 60 and are taken up by the supporting flange 62. As the group of pipes described in FIGS. 3a and 3b are no longer interconnected tho stresses are transmitted by the cold manifold to the lower plate.

The position of the fixed points for the stresses and torques due to the deformations of the secondary pipes is fixed in the proposed geometry in the upper part level with the hot manifold 70 and cold manifold 78 positioned above slab 4 and in the lower part level with the cold secondary sodium supply balloon-like member 50 and the hot secondary sodium discharge chamber 36. The thermal expansions are absorbed by the helically wound pipes 40 and 80.

A proposed geometry makes it possible in the upper part to better cope with the problems of thermal asymmetry at the secondary outlet and a better mixing of the hot secondary sodium level with the discharge manifold can be expected. The greater flexibility provided in the upper part enables it to better cope with stresses linked with the thermal asymmetry, which occurred on the cylindrical ferrules of the prior art exchangers.

What is claimed is:
1. A vertical heat exchanger for a nuclear reactor of the type in which the main vessel is sealed by an upper slab, the heat exchanger including a plurality of substan- tially straight exchange tubes mounted between an upper annular tube plate and a lower annular tube plate, said exchange tubes communicating with a supply chamber located under said lower annular tube plate and with a discharge chamber located above said upper annular tube plate, a supporting ferrule surrounding the said tubes and provided with a supply orifice and with a discharge orifice for a primary fluid, a central shaft which traverses the lower and upper annular tube plates and supplies the supply chamber with a secondary fluid, and a supply manifold and a discharge manifold for the secondary fluid, said supporting ferrule being fixed to the upper tube plate and sealed at its upper end by a dome, said ferrule having on its outer periphery a flange by which the ferrule is supported by the said slab, the manifolds being located one above the other in the supporting ferrule and supported by a horizontal plate fixed to the supporting ferrule, the supply manifold being connected by at least one pipe to an upper end of the shaft and the discharge manifold being connected by at least one pipe to the discharge chamber, said pipes being positioned in the supporting ferrule.

2. An exchanger according to claim 1, wherein the upper end of said central shaft is fixed to a balloon-like member, which is connected to the supply manifold by a plurality of helical pipes, the discharge chamber being connected to the discharge manifold by a plurality of helical pipes.

3. An exchanger according to claim 3, wherein said central shaft comprises an outer ferrule fixed by its lower end to an inner periphery of the lower annular tube plate and an inner ferrule fixed to the balloon-like member by an upper end, said inner ferrule defining with the outer ferrule an annular space provided at its lower end and level with the lower tube plate with sealing means.

4. An exchanger according to claim 3, wherein said inner ferrule includes two coaxial pipes welded at their lower end, the annular space defined by these two pipes issuing in said supporting ferrule above the discharge chamber.

5. An exchanger according to claim 1, wherein said exchanger further includes a plurality of horizontal biological protection plates positioned within said supporting ferrule and level with the reactor slab, said biological protection plates being supported by said horizontal plate fixed to the supporting ferrule.

* * * * *

UNITED STATES PATENT AND TRADEMARK OFFICE
CERTIFICATE OF CORRECTION

PATENT NO. : 4,366,854
DATED : January 4, 1983
INVENTOR(S) : ROBERT ARTAUD, MICHEL AUBERT, RICHARD ELBEZE, CHARLEY RENAUX It is certified that error appears in the above-identified patent and that said Letters Patent are hereby corrected as shown below:

Column 6, line 5, "claim 3" should read -- claim 2 --.

*Signed and Sealed this*

*Twenty-second* Day of *February 1983*

[SEAL]

Attest:

GERALD J. MOSSINGHOFF

*Attesting Officer* *Commissioner of Patents and Trademarks*